(12) United States Patent
Adachi et al.

(10) Patent No.: US 10,397,900 B2
(45) Date of Patent: *Aug. 27, 2019

(54) COMMUNICATION CONTROL METHOD

(71) Applicant: KYOCERA CORPORATION, Kyoto (JP)

(72) Inventors: Hiroyuki Adachi, Kawasaki (JP); Noriyoshi Fukuta, Yokohama (JP); Masato Fujishiro, Yokohama (JP); Kugo Morita, Yokohama (JP)

(73) Assignee: KYOCERA Corporation, Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/166,811

(22) Filed: May 27, 2016

(65) Prior Publication Data
US 2016/0278045 A1    Sep. 22, 2016

Related U.S. Application Data

(63) Continuation of application No. 15/024,359, filed as application No. PCT/JP2014/075110 on Sep. 22, 2014, now Pat. No. 9,699,767.
(Continued)

(51) Int. Cl.
| | |
|---|---|
| *H04W 72/04* | (2009.01) |
| *H04W 76/14* | (2018.01) |
| *H04W 4/90* | (2018.01) |
| *H04W 4/06* | (2009.01) |
| *H04W 72/00* | (2009.01) |

(Continued)

(52) U.S. Cl.
CPC ............ *H04W 72/04* (2013.01); *H04W 4/06* (2013.01); *H04W 4/90* (2018.02); *H04W 72/005* (2013.01); *H04W 72/0426* (2013.01); *H04W 72/06* (2013.01); *H04W 76/14* (2018.02); *H04W 92/18* (2013.01)

(58) Field of Classification Search
CPC ... H04W 72/04; H04W 76/023; H04W 72/06; H04W 4/22; H04W 72/005; H04W 72/0426; H04W 4/06; H04W 92/18
See application file for complete search history.

(56) References Cited

U.S. PATENT DOCUMENTS

2011/0268004 A1    11/2011 Doppler et al.
2012/0281569 A1    11/2012 Yamamato et al.
(Continued)

FOREIGN PATENT DOCUMENTS

| JP | 2012-235375 A | 11/2012 |
|---|---|---|
| JP | 2012235375 A | * 11/2012 |

OTHER PUBLICATIONS

International Search Report issued in PCT/JP2014/075110; dated Dec. 22, 2014, whole document.*
(Continued)

*Primary Examiner* — Un C Cho
*Assistant Examiner* — Jose L Perez
(74) *Attorney, Agent, or Firm* — Studebaker & Brackett PC

(57) ABSTRACT

A communication control method includes: a step A of receiving, by UE 100-1 in a coverage of the mobile communication system, broadcast information transmitted from eNB 200; a step B of transferring, by the UE 100-1, the broadcast information to UE 100-2 outside the coverage of the mobile communication system; and a step C of receiving, by the UE 100-2, the broadcast information transferred from the UE 100-1.

2 Claims, 17 Drawing Sheets

Related U.S. Application Data

(60) Provisional application No. 61/898,826, filed on Nov. 1, 2013, provisional application No. 61/883,655, filed on Sep. 27, 2013.

(51) Int. Cl.
  *H04W 72/06* (2009.01)
  *H04W 92/18* (2009.01)

(56) References Cited

U.S. PATENT DOCUMENTS

| | | | | |
|---|---|---|---|---|
| 2014/0112194 A1* | 4/2014 | Novlan | H04W 8/005 | 370/254 |
| 2014/0241260 A1* | 8/2014 | Schmidt | H04W 76/023 | 370/329 |
| 2014/0242963 A1* | 8/2014 | Novlan | H04W 48/16 | 455/418 |
| 2014/0295827 A1* | 10/2014 | Tesanovic | H04W 16/06 | 455/426.1 |
| 2014/0328329 A1* | 11/2014 | Novlan | H04W 72/042 | 370/336 |
| 2014/0342747 A1* | 11/2014 | Lee | H04L 5/0053 | 455/450 |
| 2015/0009910 A1* | 1/2015 | Ryu | H04W 72/04 | 370/329 |
| 2015/0237459 A1* | 8/2015 | Webb | H04L 5/0007 | 370/312 |

OTHER PUBLICATIONS

Written Opinion issued in PCT/JP2014/075110; dated Dec. 22, 2014, whole document.*
3rd Generation Partnership Project; Technical Specification Group Services and System Aspects; Feasibility study for Proximity Services (ProSe); 3GPP TR 22.803; V12.2.0; Jun. 2013; Release 12; 3GPP Organizational Partners, whole document.*
LG Electronics; Resource Management for D2D Communications; 3GPP TSG RAN WG1 Meeting #74; R1-133385; Aug. 19-23, 2013; Barcelona, Spain, whole document.*
ETRI; Unicast, groupcast/broadcast, and relay for public safety D2D communications; 3GPP TSG-RAN1 Meeting #74; R1-133181; Aug. 19-23, 2013; Barcelona, Spain, whole document.*
ASUSTeK; Design Guideline for D2D Communication; 3GPP TSG RAN WG1 Meeting #74; R1-133566; Aug. 19-23, 2013; Barcelona, Spain, whole document.*
HTC; Considerations on designs for D2D discovery; 3GPP TSG RAN WG1 Meeting #74; R1-133265; Aug. 19-23, 2013; Barcelona, Spain, whole document.*
Pfaffenberger, Webster's New World Computer Dictionary, entry for "Central Processing Unit", Hungry Minds, Inc., Ninth Edition, 2001, p. 68.*
ASUSTeK, R1-133566, Design Guideline for D2D Communication, Aug. 19-23, 2013, 3GPP TSG RAN WG1 Meeting #74, whole document.*
International Search Report issued in PCT/JP2014/075110; dated Dec. 22, 2014.
Written Opinion issued in PCT/JP2014/075110; dated Dec. 22, 2014.
3rd Generation Partnership Project; Technical Specification Group Services and System Aspects; Feasibility study for Proximity Services (ProSe); 3GPP TR 22.803; V12.2.0; Jun. 2013; pp. 1-45; Release 12; 3GPP Organizational Partners.
LG Electronics; Resource Management for D2D Communications; 3GPP TSG RAN WG1 Meeting #74; R1-133385; Aug. 19-23, 2013; pp. 1-11; Barcelona, Spain.
ETRI; Unicast, groupcast/broadcast, and relay for public safety D2D communications; 3GPP TSG-RAN1 Meeting #74; R1-133181; Aug. 19-23, 2013; pp. 1-11; Barcelona, Spain.
ASUSTeK; Design Guideline for D2D Communication; 3GPP TSG RAN WG1 Meeting #74; R1-133566; Aug. 19-23, 2013; pp. 1-5; Barcelona, Spain.
HTC; Considerations on designs for D2D discovery; 3GPP TSG RAN WG1 Meeting #74; R1-133265; Aug. 19-23, 2013; pp. 1-4; Barcelona, Spain.
Communication issued in by the European Patent Office in corresponding EP Appln No. 14849680.5-1853 on Mar. 1, 2017; 10pp.

* cited by examiner

FIG. 19
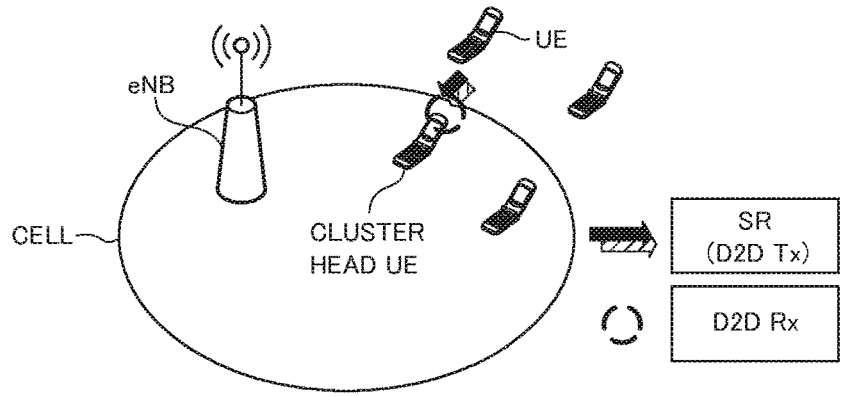
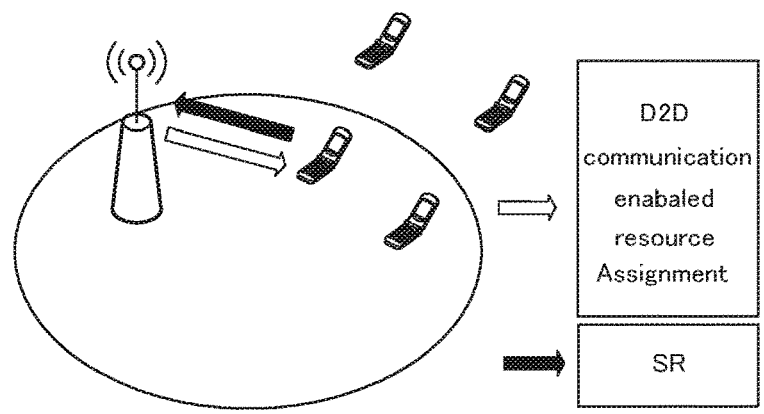
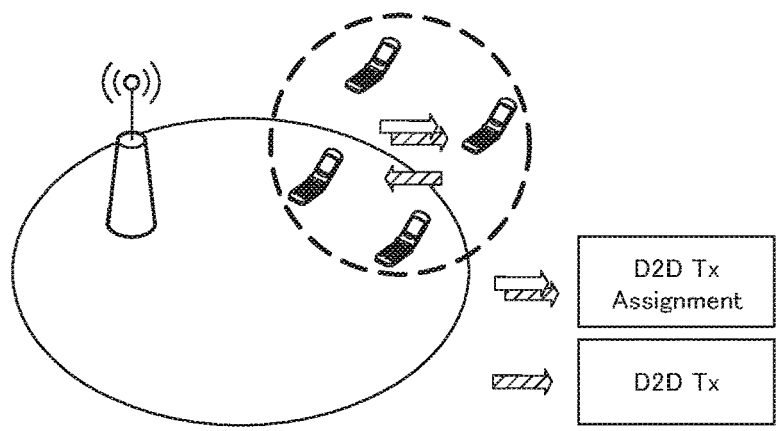

FIG. 20
STEP 1
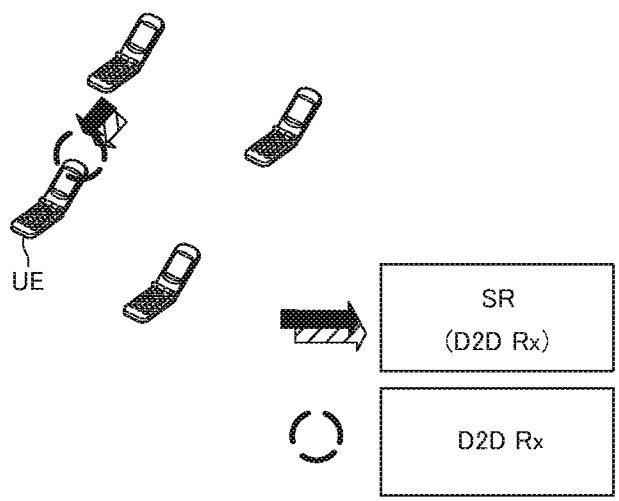
STEP 2
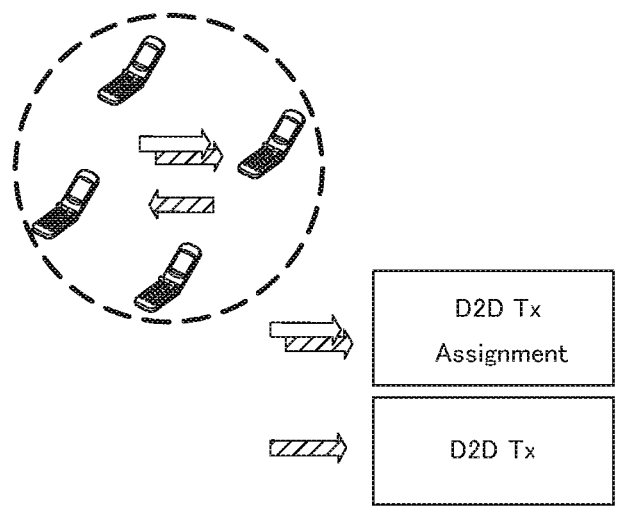

FIG. 21
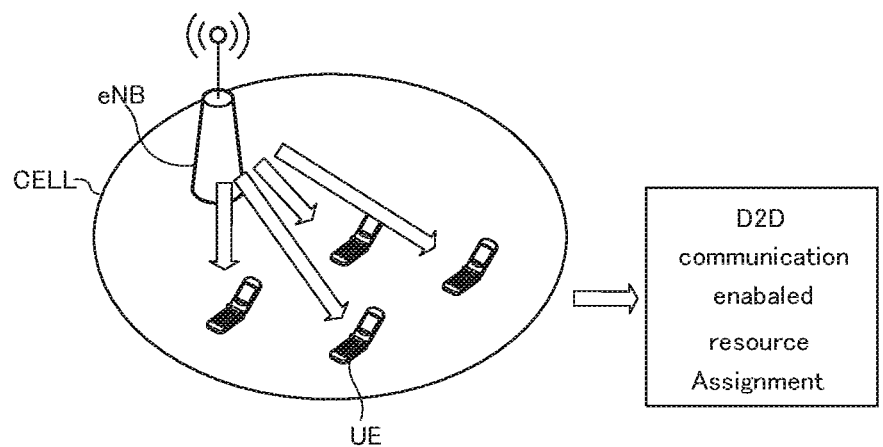
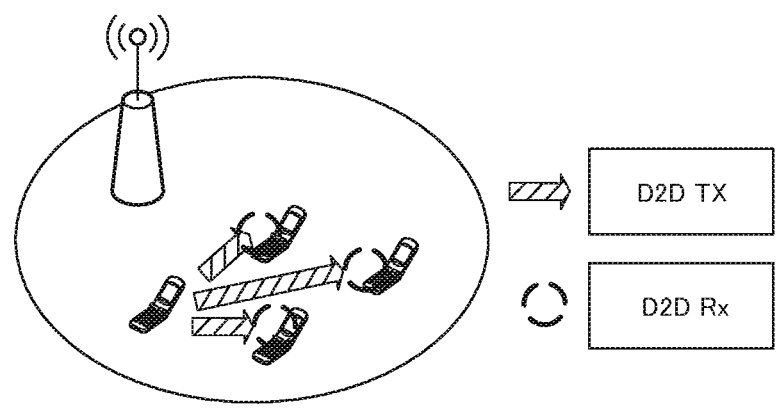

FIG. 22
STEPS 1 AND 2
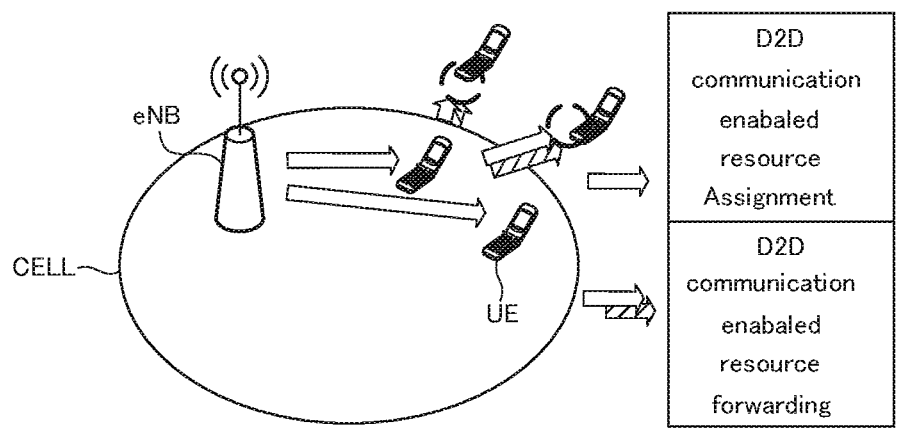
STEP 3
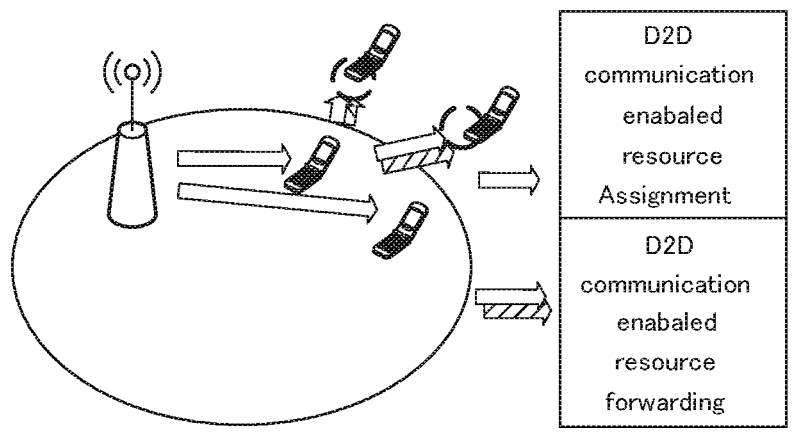

COMMUNICATION CONTROL METHOD

TECHNICAL FIELD

The present invention relates to a communication control method used in a mobile communication system supporting D2D communication.

BACKGROUND ART

In 3GPP (3rd Generation Partnership Project) which is a project aiming to standardize a mobile communication system, the introduction of terminal-to-terminal (D2D: Device-to-Device) communication is discussed as a new function in and after Release 12 (see Non Patent Document 1).

In the D2D communication, in a terminal group configured by a plurality of adjacent user terminals, direct Device-to-Device communication is performed without passing through a network. On the other hand, in cellular communication which is normal communication in a mobile communication system, user terminals make communication through a network.

In the D2D communication, since radio communication with low transmission power can be performed between adjacent user terminals, a power consumption of the user terminals and a load on the network can be reduced in comparison with the cellular communication.

PRIOR ART DOCUMENTS

Non Patent Document

[Non Patent Document 1] 3GPP technical report "TR 22.803 V12.2.0" June, 2013

SUMMARY OF INVENTION

In order to avoid interference between D2D communication and cellular communication, the D2D communication is preferably performed under the management of a network (base station).

However, when a user terminal group performing D2D communication includes a user terminal out of a coverage of a mobile communication system, information from the network cannot be transmitted to the user terminal.

Thus, an object of the present invention is to provide a communication control method capable of appropriately controlling D2D communication.

A communication control method according to a first aspect is used in a mobile communication system supporting D2D communication which is direct terminal-to-terminal communication. The communication control method includes: a step A of receiving, by a first user terminal in a coverage of the mobile communication system, broadcast information transmitted from a base station; a step B of transferring, by the first user terminal, the broadcast information to a second user terminal outside the coverage of the mobile communication system; and a step C of receiving, by the second user terminal, the broadcast information transferred from the first user terminal.

A communication control method according to a second aspect is used in a mobile communication system supporting D2D communication which is direct terminal-to-terminal communication. The communication control method includes: a step A of transmitting, from a first user terminal of RRC connected mode in coverage of a base station of the mobile communication system to the base station, request information for requesting assignment of radio resources to be used for the D2D communication; and a step B of receiving, by the first user terminal, resource assignment information indicating radio resources assigned in response to the request information.

A communication control method according to a third aspect is used in a mobile communication system supporting D2D communication which is direct terminal-to-terminal communication. The communication control method includes: a step A of determining, by a base station of the mobile communication system, radio resources to be used for the D2D communication on the basis of number of user terminal having an interest in the D2D communication; and a step B of broadcasting, by the base station, resource assignment information indicating the determined radio resources.

A communication control method according to a fourth aspect is used in a mobile communication system supporting D2D communication which is direct terminal-to-terminal communication. Radio resources to be used for the D2D communication are predefining. The communication control method includes: a step of autonomously performing, by a first user terminal outside coverage of a base station of the mobile communication system, the D2D communication using the predefined radio resources.

BRIEF DESCRIPTION OF DRAWINGS

FIG. 19 is a diagram illustrating semi-distributed resource allocation procedure (partial coverage scenario) according to the second embodiment.

FIG. 20 is a diagram illustrating semi-distributed resource allocation procedure (out of coverage scenario) according to the second embodiment.

FIG. 21 is a diagram illustrating distributed resource allocation procedure (in-coverage scenario) according to the second embodiment.

FIG. 22 is a diagram illustrating distributed resource allocation procedure (partial coverage scenario) according to the second embodiment.

DESCRIPTION OF EMBODIMENTS

Overview of the Embodiments

Figure 1:
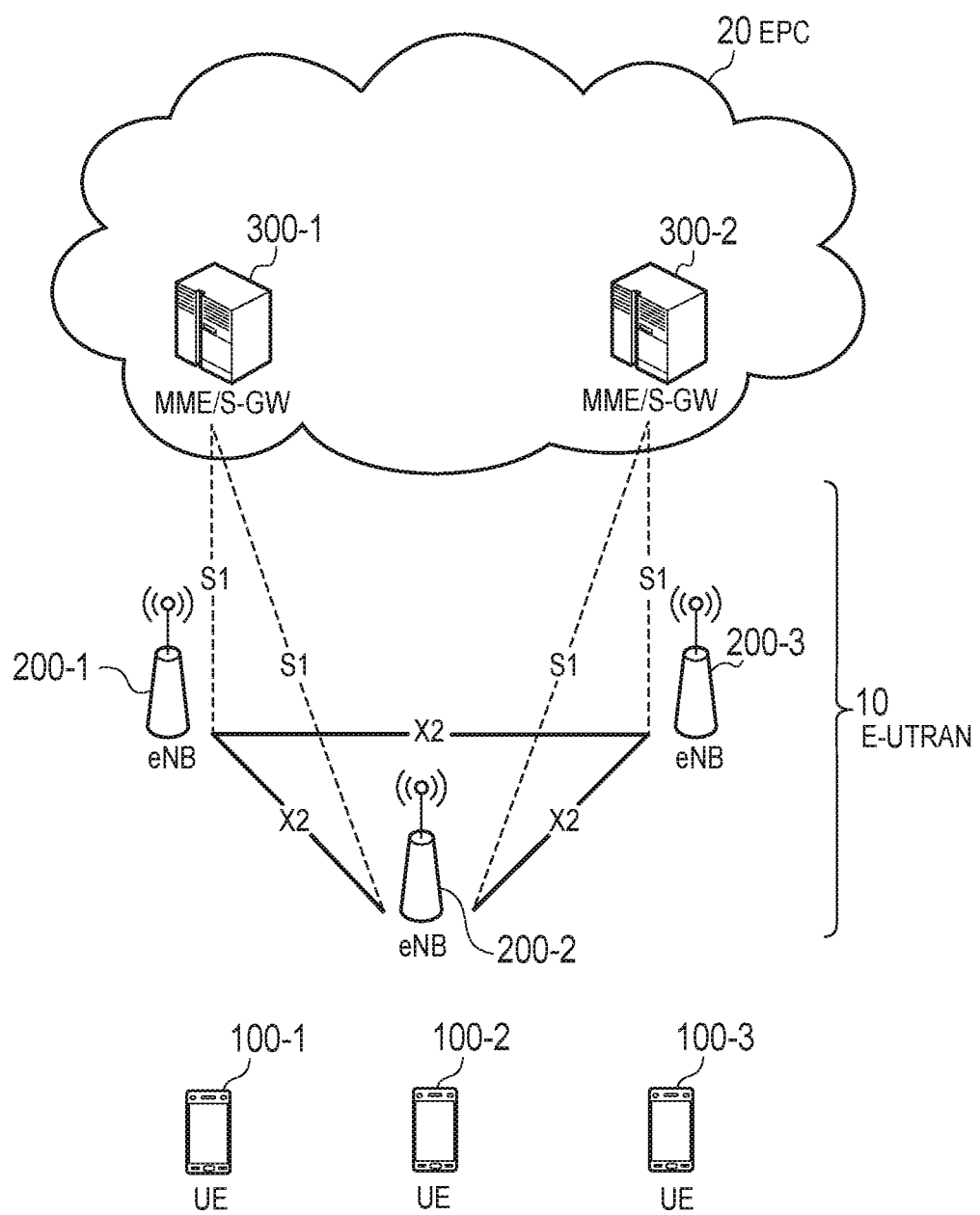
FIG. 1 is a configuration diagram of an LTE system according to first and second embodiments.

A communication control method according to first embodiment is used in a mobile communication system that supports D2D communication that is direct Device-to-Device communication. The communication control method includes a step A of receiving, by a first user terminal in a coverage of the mobile communication system, broadcast information transmitted from a base station; a step B of transferring, by the first user terminal, the broadcast information to a second user terminal outside the coverage of the mobile communication system; and a step C of receiving, by the second user terminal, the broadcast information transferred from the first user terminal.

In the first embodiment, the broadcast information includes D2D resource information indicating radio resources available for the D2D communication.

In the first embodiment, the broadcast information includes warning information distributed by a warning distribution system.

In the first embodiment, the communication control method further includes a step of performing, on the basis of the broadcast information, the D2D communication between the first user terminal and the second user terminal with the radio resources available for the D2D communication.

In the first embodiment, some radio resources available for the D2D communication are secured as special radio resources to transfer the broadcast information. In the step B, the first user terminal transfers the broadcast information to the second user terminal with the special radio resources.

In a modification of the first embodiment, some radio resources available for the D2D communication are secured as special radio resources to transmit information required to be transmitted with high reliability and at a low delay in the D2D communication.

In a modification of the first embodiment, when the first user terminal receives the warning information in the step A, in the step B, the first user terminal preferentially assigns the radio resources available for the D2D communication to transferring of the warning information and then transfers the warning information to the second user terminal.

A first user terminal according to first embodiment is in a coverage of a mobile communication system, in the mobile communication system that supports D2D communication that is direct Device-to-Device communication. The first user terminal includes a receiver that receives broadcast information transmitted from a base station; and a controller that transfers the broadcast information to a second user terminal outside the coverage of the mobile communication system.

A second user terminal according to the first embodiment is outside a coverage of a mobile communication system, in the mobile communication system that supports D2D communication that is direct Device-to-Device communication. The second user terminal includes a receiver that receives broadcast information that is received from a base station by a first user terminal in the coverage of the mobile communication system and that is transferred from the first user terminal.

A communication control method according to a second embodiment is used in a mobile communication system supporting D2D communication which is direct terminal-to-terminal communication. The communication control method includes: a step A of transmitting, from a first user terminal of RRC connected mode in coverage of a base station of the mobile communication system to the base station, request information for requesting assignment of radio resources to be used for the D2D communication; and a step B of receiving, by the first user terminal, resource assignment information indicating radio resources assigned in response to the request information.

In the second embodiment, the communication control method further includes: a step C of transferring the resource assignment information from the first user terminal to a second user terminal outside the coverage.

A communication control method according to the second embodiment is used in a mobile communication system supporting D2D communication which is direct terminal-to-terminal communication. The communication control method includes: a step A of determining, by a base station of the mobile communication system, radio resources to be used for the D2D communication on the basis of number of user terminal having an interest in the D2D communication; and a step B of broadcasting, by the base station, resource assignment information indicating the determined radio resources.

In the second embodiment, the communication control method further includes: a step C of receiving the resource assignment information by a first user terminal in coverage of the base station; and a step D of transferring the resource assignment information from the first user terminal to a second user terminal outside the coverage.

A communication control method according to the second embodiment is used in a mobile communication system supporting D2D communication which is direct terminal-to-terminal communication. The communication control method includes: predefining radio resources to be used for the D2D communication; and a step of autonomously performing, by a first user terminal outside coverage of a base station of the mobile communication system, the D2D communication using the predefined radio resources.

First Embodiment

Hereinafter, an embodiment in a case where the present invention is applied to an LTE system will be described.

(System Configuration)

FIG. 1 is a configuration diagram of an LTE system according to the first embodiment. As illustrated in FIG. 1, the LTE system includes UEs (User Equipments) 100, E-UTRAN (Evolved-UMTS Terrestrial Radio Access Network) 10, and EPC (Evolved Packet Core) 20.

The UE 100 corresponds to the user terminal. The UE 100 is a mobile radio communication device and performs radio communication with a cell (a serving cell) with which a connection is established. The configuration of UE 100 will be described later.

The E-UTRAN 10 corresponds to a radio access network. The E-UTRAN 10 includes a plurality of eNBs 200 (evolved Node-Bs). The eNB 200 corresponds to a base station. The eNBs 200 are connected mutually via an X2 interface. The configuration of eNB 200 will be described later.

The eNB 200 manages one or a plurality of cells and performs radio communication with the UE 100 with which a connection with the cell of the eNB 200 is established. The eNB 200 has a radio resource management (RRM) function, a routing function of user data, and a measurement control function for mobility control and scheduling. The "cell" is used as a term indicating a minimum unit of a radio communication area, and is also used as a term indicating a function of performing radio communication with the UE 100.

The EPC 20 corresponds to a core network. A network of the LTE system is configured by the E-UTRAN 10 and the EPC 20. The EPC 20 includes MME (Mobility Management Entity)/S-GW (Serving-Gateways) 300. The MME performs various mobility controls for UE 100. The S-GW performs transfer control of user data. The MME/S-GW 300 is connected to the eNB 200 via an S1 interface.

Figure 2:
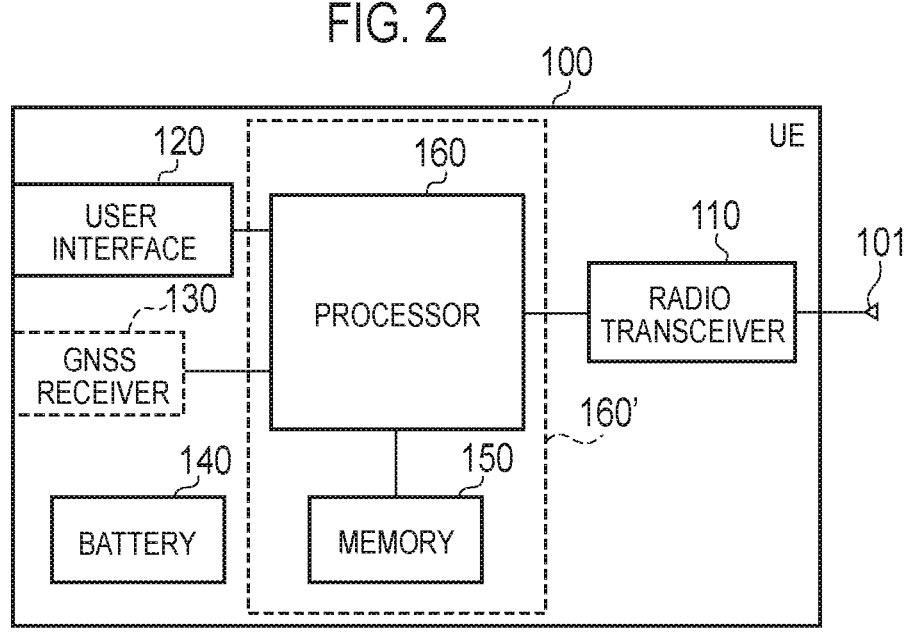
FIG. 2 is a block diagram of a UE according to the first and second embodiments.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a controller. The UE 100 may not have the GNSS receiver 130. Furthermore, the memory 150 may be integrally formed with the processor 160, and this set (that is, a chipset) may be called a processor 160'.

The antenna 101 and the radio transceiver 110 are used to transmit and receive radio signals. The radio transceiver 110 converts a baseband signal (transmission signal) output from the processor 160 into the radio signal, and transmits the radio signal from the antenna 101. Furthermore, the radio transceiver 110 converts the radio signal received by the antenna 101 into the baseband signal (reception signal), and outputs the baseband signal to the processor 160.

The user interface 120 is an interface with a user carrying the UE 100, and for example, includes a display, a microphone, a speaker, various buttons and the like. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like of a baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

Figure 3:
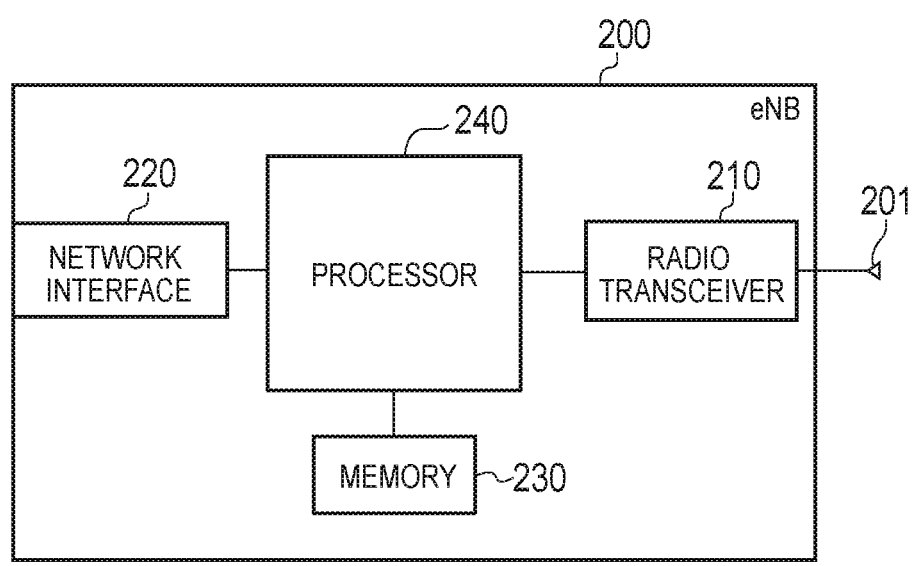
FIG. 3 is a block diagram of an eNB according to the first and second embodiments.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a controller.

The antenna 201 and the radio transceiver 210 are used to transmit and receive radio signals. The radio transceiver 210 converts the baseband signal (transmission signal) output from the processor 240 into the radio signal, and transmits the radio signal from the antenna 201. Furthermore, the radio transceiver 210 converts the radio signal received by the antenna 201 into the baseband signal (reception signal), and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes a baseband processor that performs modulation and demodulation, encoding and decoding and the like of a baseband signal, and a CPU that performs various processes by executing the program stored in the memory 230. The processor 240 implements various processes and various communication protocols described later.

Figure 4:
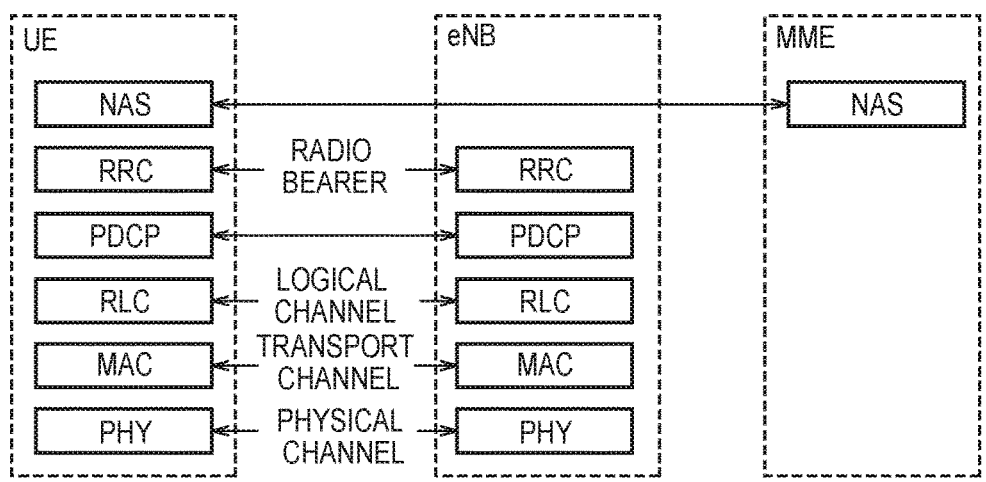
FIG. 4 is a protocol stack diagram of a radio interface according to the first and second embodiments.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, resource mapping and demapping, and the like. Between the PHY layer of the UE 100 and the PHY layer of the eNB 200, data is transmitted via the physical channel.

The MAC layer performs preferential control of data, and a retransmission process and the like by hybrid ARQ (HARQ). Between the MAC layer of the UE 100 and the MAC layer of the eNB 200, data is transmitted via a transport channel. The MAC layer of the eNB 200 includes a scheduler for determining a transport format (a transport block size, a modulation and coding scheme, and the like) and resource blocks to be assigned for an uplink and a downlink.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in a connected mode (an RRC connected mode), and when there is no RRC connection, the UE 100 is in an idle mode (an RRC idle mode).

A NAS (Non-Access Stratum) layer positioned above the RRC layer performs session management, mobility management and the like.

Figure 5:
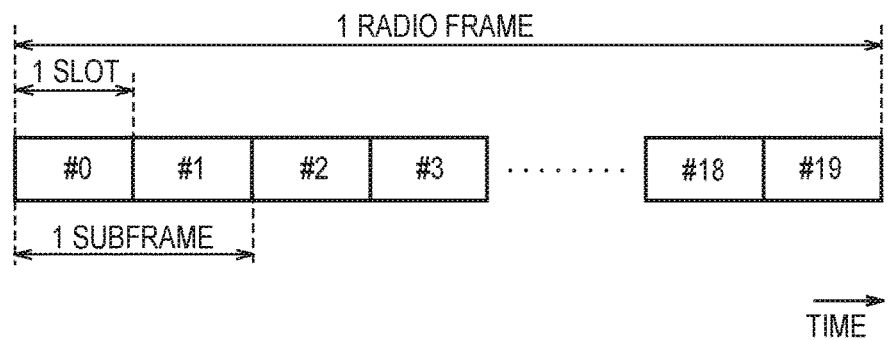
FIG. 5 is a configuration diagram of a radio frame according to the first and second embodiments.

FIG. 5 is a configuration diagram of a radio frame used in the LTE system. In the LTE system, OFDMA (Orthogonal Frequency Division Multiple Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction. A resource element (RE) is configured by one subcarrier and one symbol.

Furthermore, among radio resources assigned to the UE 100, a frequency resource can be designated by a resource block and a time resource can be designated by a subframe (or a slot).

In a downlink, an interval of several symbols at the head of each subframe is a control region mainly used as a physical downlink control channel (PDCCH). Furthermore, the remaining interval of each subframe is a region that can be mainly used as a physical downlink shared channel (PDSCH).

In an uplink, both ends, in the frequency direction, of each subframe are control regions mainly used as a physical uplink control channel (PUCCH). Furthermore, the center portion, in the frequency direction, of each subframe is a region that can be mainly used as a physical uplink shared channel (PUSCH).

(D2D Communication)

Figure 6:
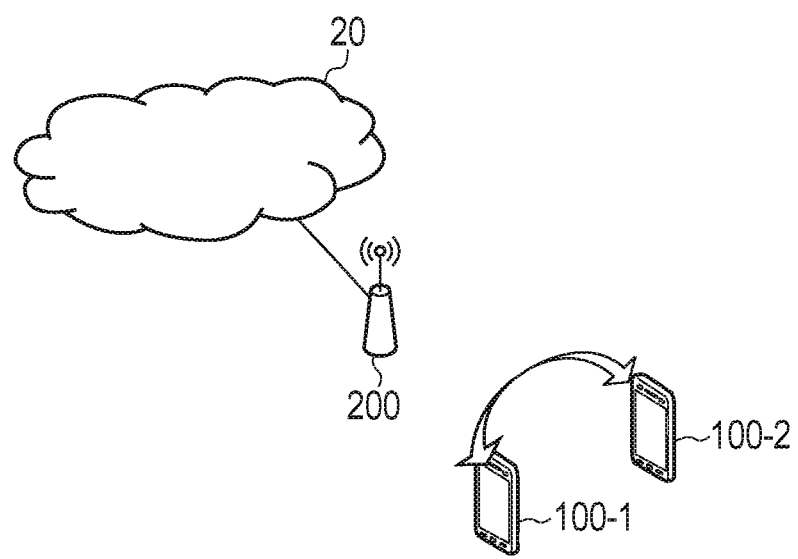
FIG. 6 is a diagram for explaining D2D communication according to the first and second embodiments.

The LTE system according to the first embodiment supports D2D communication that is direct Device-to-Device communication (UE-to-UE communication). FIG. 6 is a diagram for explaining D2D communication according to the first embodiment.

Hereinafter, the D2D communication will be described in comparison with cellular communication that is normal communication of the LTE system. The cellular communication is a communication mode in which a data path is made through a network (E-UTRAN10, EPC20). The data path is a transmission path for user data.

In contrast to this, as shown in FIG. 6, the D2D communication is a communication mode in which a data path set between UEs is made without a network. A plurality of UEs 100 (UE 100-1 and UE 100-2) adjacent to each other directly perform radio communication with low transmission power.

In this manner, the plurality of adjacent UEs 100 directly perform radio communication with low transmission power to make it possible to reduce a power consumption of the UE 100 in comparison with in cellular communication and to reduce interference to a neighbouring cell.

A frequency band of the D2D communication may be shared with a frequency band of the cellular communication, or may be different from the frequency band of the cellular communication. In the first embodiment, in terms of efficiency in the use of frequencies, a case is assumed where the frequency band of the D2D communication is shared with the frequency band of the cellular communication.

In order to more improve the efficiency in the use of frequencies, radio resources available for the cellular communication and/or radio resources available for the D2D communication may be changeable depending on traffic conditions or the like.

In the first embodiment, as a mode of the D2D communication in a lower layer, a broadcast is mainly assumed. For example, CSMA (Carrier Sense Multiple Access) is applied to the D2D communication. The D2D communication performed by such a broadcast is especially suitably applied to public safety in a time of disaster or the like. It is noted that the D2D communication can be applied to a group-cast (multicast) or a unicast by performing encryption or the like in an upper layer.

Operation According to First Embodiment

Figure 7:
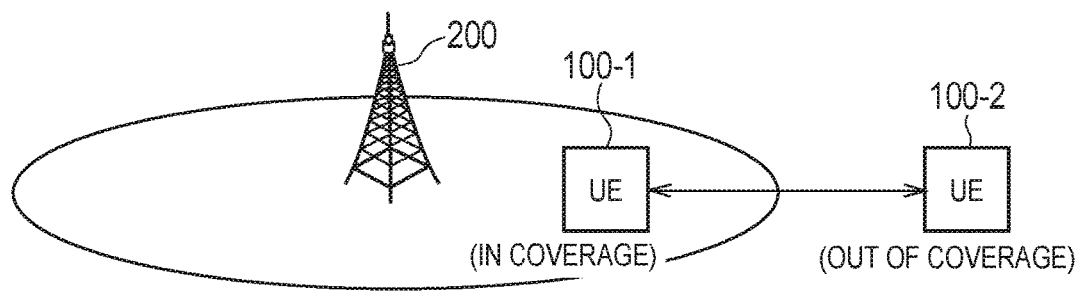
FIG. 7 is a diagram for explaining an operation environment according to the first embodiment.

FIG. 7 is a diagram for explaining an operation environment according to the first embodiment.

As shown in FIG. 7, the plurality of UEs 100 form a UE group (referred to as "D2D group" hereinafter) performing D2D communication. It is noted that the D2D group may also be called a cluster.

The D2D group shown in FIG. 7 includes a UE 100-1 in a coverage of an eNB 200 (simply referred to as "coverage" hereinafter) and a UE 100-2 out of the coverage. The UE 100-1 and the UE 100-2 are synchronized with each other. Each of the UE 100-1 and the UE 100-2 may recognize the other UE by a neighbour discovery process.

In the following description, a case in which some UEs 100 in the D2D group are located in the coverage and the remaining UEs 100 are located outside the coverage is called "Partial coverage". In the first embodiment, the Partial coverage case is mainly assumed.

It is noted that a case in which all the UEs 100 forming the D2D group are located in the coverage is called "In coverage". A case in which all the UEs 100 forming the D2D group are located outside the coverage is called "Out of coverage". Furthermore, an In coverage case includes a case in which the UEs 100 forming the D2D group are present in the same cell and a case in which the UEs 100 forming the D2D group are present dispersed in a plurality of cells.

As described above, when the frequency band of D2D communication is shared with the frequency band of cellular communication, interference between the D2D communication and the cellular communication (D2D-to-cellular interference) or overlapping between transmission and reception timings is posed as a problem.

Figure 8:
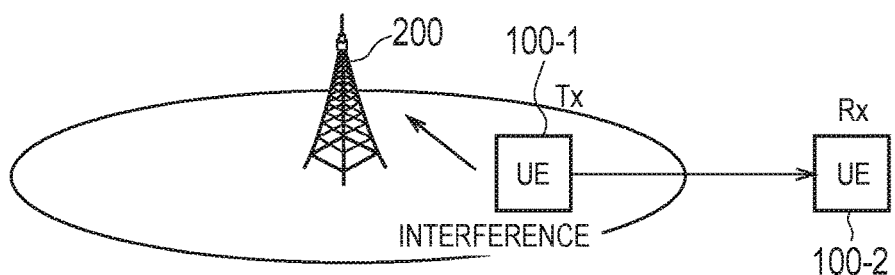
FIG. 8 is a diagram for explaining D2D-to-cellular interference in a Partial coverage case (part 1).

FIG. 8 is a diagram for explaining the D2D-to-cellular interference in a Partial coverage case. In the following description, a case is assumed where the frequency band of D2D communication is shared with the uplink frequency band of cellular communication.

As shown in FIG. 8, when the in-coverage UE 100-1 freely performs transmission (D2D transmission) in the D2D communication, the corresponding D2D transmission may disadvantageously interfere with an uplink of an in-coverage UE (cellular UE) except for the UE 100-1.

Figure 9:
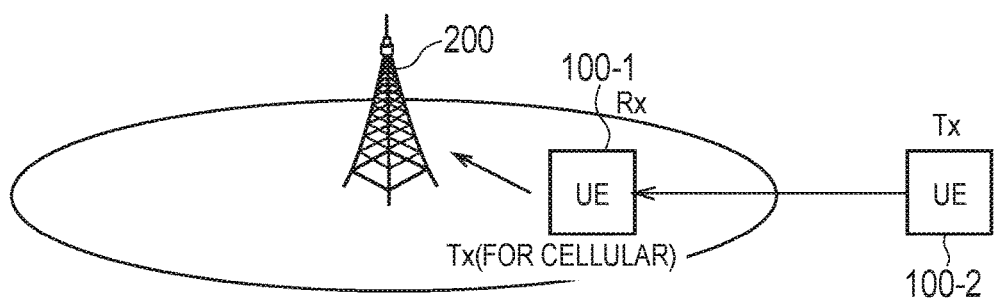
FIG. 9 is a diagram for explaining D2D-to-cellular interference in a Partial coverage case (part 2).

FIG. 9 is a diagram for explaining overlapping between transmission and reception timings in a Partial coverage case.

As shown in FIG. 9, when the in-coverage UE 100-1 uses both the cellular communication and the D2D communication together, and when the out-of-coverage UE 100-2 freely performs D2D transmission, a timing of D2D transmission to the UE 100-1 and a timing of cellular transmission of the UE 100-1 overlap each other. Thus, the UE 100-1 not capable of performing D2D reception during cellular transmission may not succeed in D2D communication.

For this reason, in order to avoid D2D-to-cellular interference and overlapping between transmission and reception timings, D2D communication is preferably performed under the management of a network (eNB 200).

Figure 10:
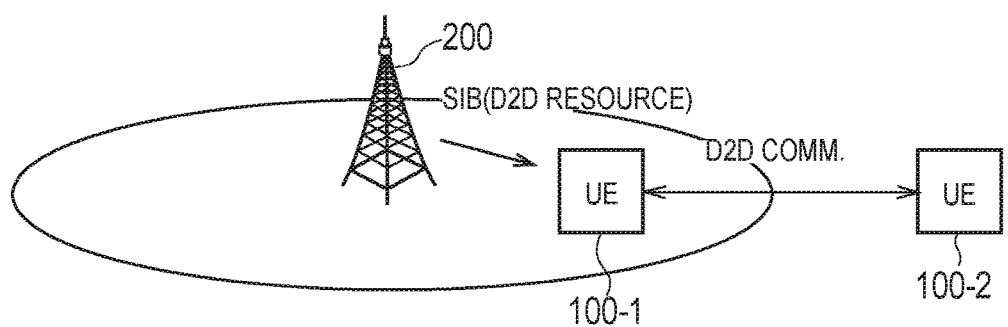
FIG. 10 is a diagram for explaining a communication control method (D2D resource management method) according to the first embodiment.

FIG. 10 is a diagram for explaining a communication control method (D2D resource management method) according to the first embodiment.

As shown in FIG. 10, the communication control method according to the first embodiment includes a step A of, by the in-coverage UE 100-1, to receiving broadcast information transmitted from the eNB 200. The broadcast information includes D2D resource information indicating radio resources (for example, a resource block and a sub-frame) available for the D2D communication. The broadcast information is, for example, a system information block (SIB). The SIB is a common RCC message commonly applied to a plurality of UEs in a coverage.

In this manner, in the first embodiment, the radio resources (referred to as "D2D resources" hereinafter) available for the D2D communication is notified through broadcast from the eNB 200 to the in-coverage UE 100-1. The D2D resources are managed by the eNB 200. Thus, since the in-coverage UE 100-1 performs the D2D communication with the radio resources managed by the eNB 200, the D2D-to-cellular interference can be avoided.

It is noted that it is general that resources are dynamically assigned on a PDCCH in the cellular communication. On the other hand, when broadcast is assumed as a mode of the D2D communication in a lower layer, D2D resources are not dynamically scheduled, and quasi-static scheduling is assumed to be applied. Thus, unlike in the resource assignment in the cellular communication, the D2D resources are preferably notified by the SIB.

The communication control method according to the first embodiment includes a step B of transferring, by the in-coverage UE 100-1, broadcast information to the out-of-coverage UE 100-2, and a step C of receiving, by the UE 100-2, the broadcast information transferred from the UE 100-1. In the step B, the in-coverage UE 100-1 broadcasts the D2D resource information again to transfer the D2D resource information to the out-of-coverage UE 100-2. Since this enables the out-of-coverage UE 100-2 to comprehend the D2D resources and perform the D2D communication with radio resources managed by the eNB 200, transmission and reception timings can be avoided from overlapping each other.

Thus, according to the communication control method of the first embodiment, the D2D-to-cellular interference and the overlapping between transmission and reception timings can be avoided in a Partial coverage case. Furthermore, also in an In coverage case, the D2D-to-cellular interference and the overlapping between transmission and reception timings can be avoided as a matter of course.

Figure 11:
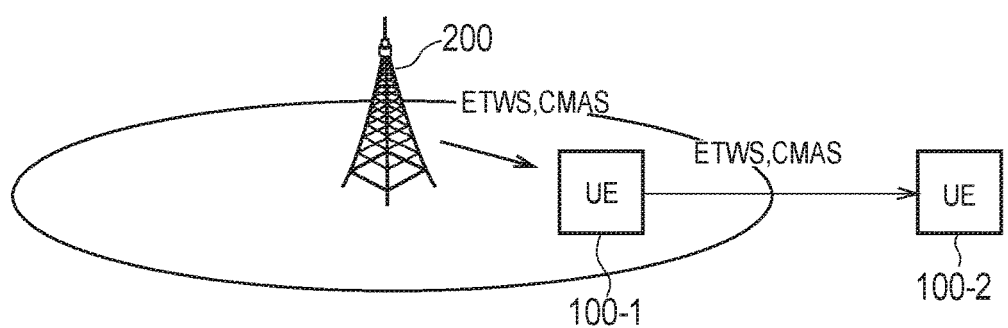
FIG. 11 is a diagram for explaining a communication control method (warning transfer method) according to the first embodiment.

The communication control method according to the first embodiment can be applied to not only the D2D resource information but also warning information distributed by an warning distribution system. The warning distribution system includes ETWS (Earthquake and Tsunami Warning System), CMAS (Commercial Mobile Alert System), and the like. The warning information is broadcast by the SIB. FIG. 11 is a diagram for explaining a communication control method (warning transfer method) according to the first embodiment.

As shown in FIG. 11, the in-coverage UE 100-1 receives the warning information broadcast by the SIB from the eNB 200 and then broadcasts the warning information again to transfer the warning information to the out-of-coverage UE 100-2. This enables even the out-of-coverage UE 100-2 to acquire the warning information distributed by the warning distribution system.

Figure 12:
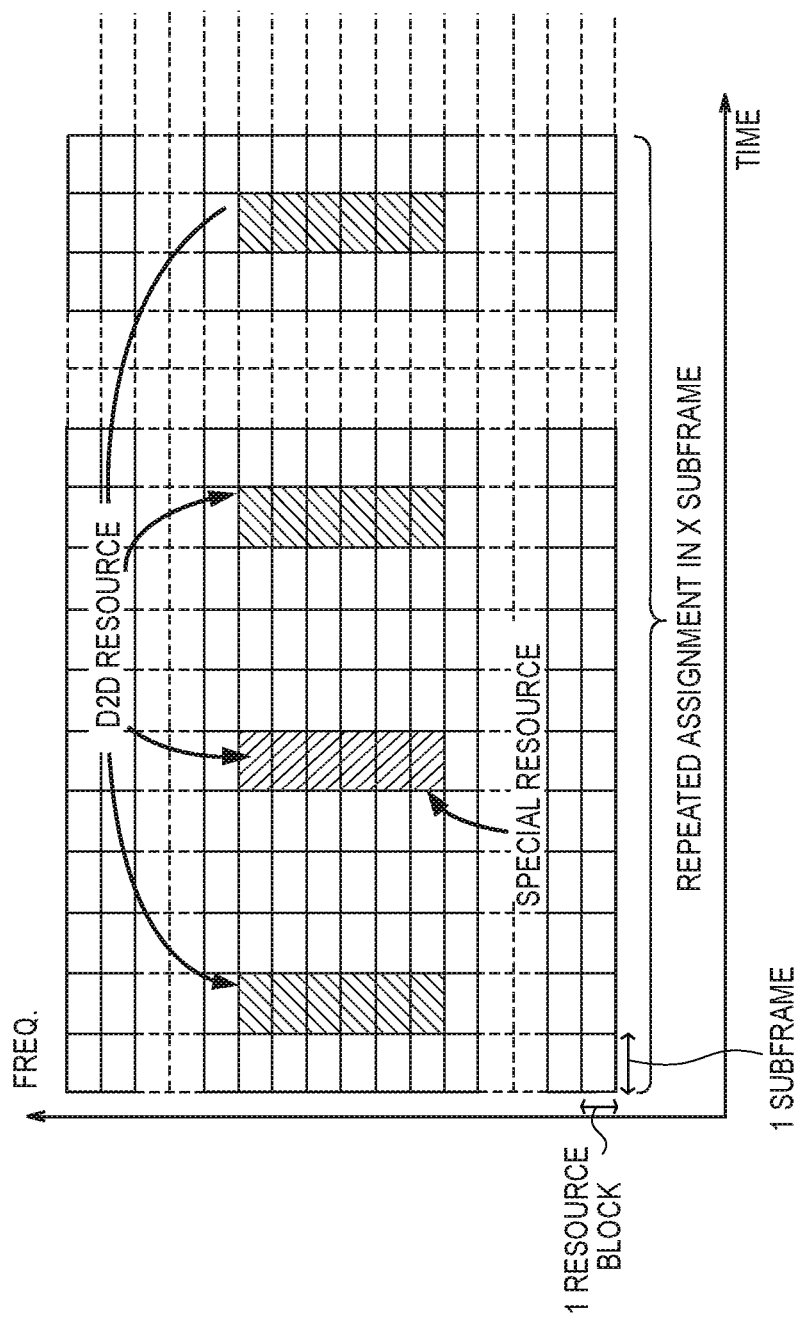
FIG. 12 is a diagram for explaining D2D resources including special radio resources according to the first embodiment.

In the first embodiment, some D2D resources are secured as special radio resources to transfer the broadcast information (D2D resource information and warning information). FIG. 12 is a diagram for explaining the D2D resources including the special radio resources.

As shown in FIG. 12, the D2D resources configured by a plurality of resource blocks are periodically assigned. Some D2D resources are secured as special radio resources (Special resources) to transfer broadcast information without being used in data transmission in D2D communication. Thus, the in-coverage UE 100-1 can transfer the broadcast information to the out-of-coverage UE 100-2 with more reliability and at a low delay.

The special radio resources are predetermined. Alternatively, the special radio resources may be determined by predetermined rules. Still alternatively, the special radio resources may be designated by the eNB 200. In this case, the eNB 200 may transmit information indicating the special radio resources through broadcast.

The eNB 200 restricts use of the D2D resources (including the special radio resources) in the cellular communication.

Figure 13:
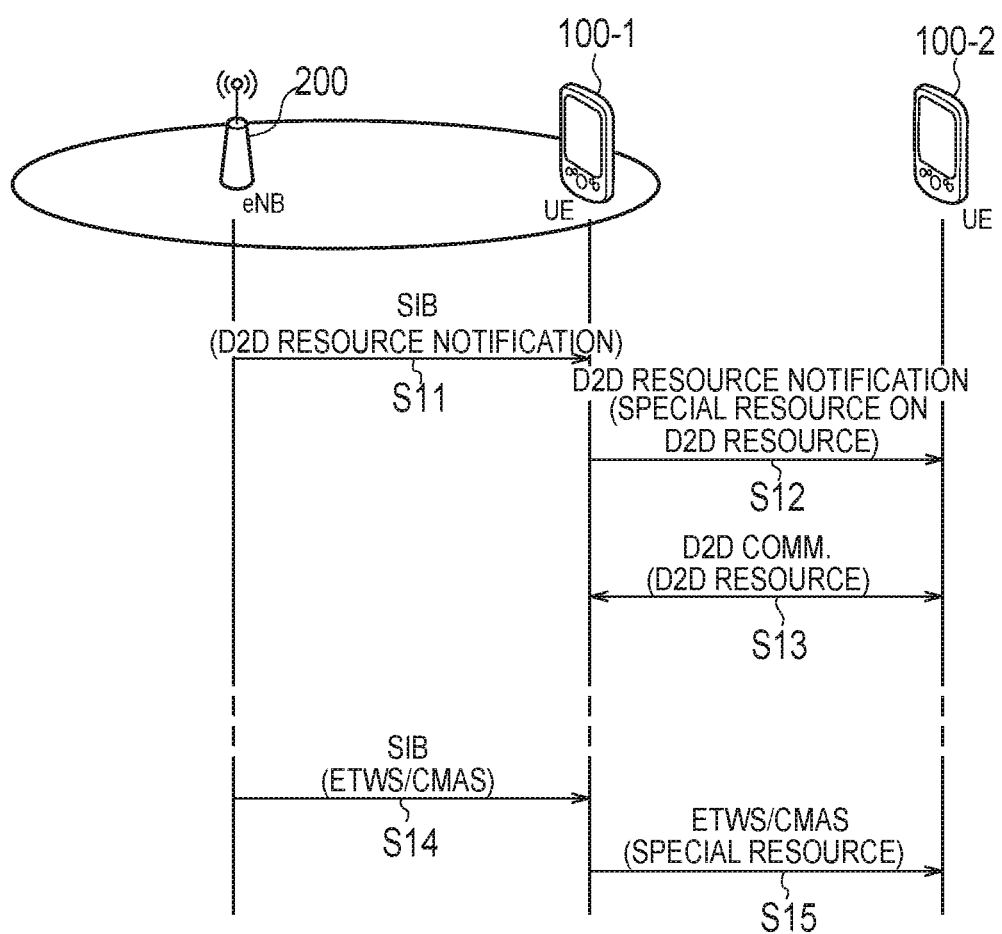
FIG. 13 is an operation sequence diagram according to the first embodiment.

FIG. 13 is an operation sequence diagram according to the first embodiment.

As shown in FIG. 13, in step S11, the eNB 200 secures D2D resources and broadcasts D2D resource information (D2D resource notification) by the SIB. The in-coverage UE 100-1 receives the D2D resource information from the eNB 200.

In step S12, the in-coverage UE 100-1 transmits the D2D resource information with the special radio resources through broadcast. Since the special radio resources are secured in advance, the D2D resource information can be transferred to the out-of-coverage UE 100-2 with high reliability and at a low delay.

In step S13, the in-coverage UE 100-1 and the out-of-coverage UE 100-2 perform D2D communication with the D2D resources except for the special radio resources.

In step S14, the eNB 200 broadcasts warning information (ETWS information or CMAS information) by the SIB. The in-coverage UE 100-1 receives the warning information from the eNB 200.

In step S15, the in-coverage UE 100-1 transmits the warning information with the special radio resources through broadcast. Since the special radio resources are secured in advance, the warning information can be transferred to the out-of-coverage UE 100-2 with high reliability and at a low delay.

Conclusion of First Embodiment

As described above, the D2D resources are notified from the eNB 200 to the in-coverage UE 100-1 through broadcast. The in-coverage UE 100-1 broadcasts the D2D resource information again to transfer the D2D resource information to the out-of-coverage UE 100-2. Thus, even in the Partial coverage case, the D2D-to-cellular interference and the overlapping between transmission and reception timings can be avoided.

In the first embodiment, some D2D resources are secured as special radio resources to transfer the broadcast information. Thus, the broadcast information (D2D resource information and warning information) can be transferred to the out-of-coverage UE 100-2 with more reliability and at a low delay.

[First Modification]

In the first embodiment described above, a Partial coverage case has been mainly described. However, the present invention can also be applied to an In coverage case. In the In coverage case, some D2D resources may be secured as special radio resources to transmit, in the D2D communication, information required to be transmitted with high reliability and at a low delay. The information required to be transmitted with high reliability and at a low delay includes data such as a control signal or audio data (especially, an emergency call) that requires high QoS (Quality of Service). In this manner, the special radio resources are not used to transfer the broadcast information, and the special radio resources can be used to transmit the information required to be transmitted with high reliability and at a low delay.

[Second Modification]

In the first embodiment described above, the presence of a control UE (cluster head) that controls D2D communication in the D2D group (cluster) is not particularly considered.

In case of the presence of the control UE, scheduling can be performed such that a transmission side and a reception side in the D2D group are time-divisionally switched. Thus, when the in-coverage UE 100-1 is the control UE, it is possible to avoid the problem that the overlapping between transmission and reception timings shown in FIG. 9. In spite of such scheduling, when the control UE (UE 100-1) receives warning information from the eNB 200, the control UE may preferentially assign the D2D resources to transferring of warning information and then transfer the warning information to the out-of-coverage UE 100-2.

Figure 14:
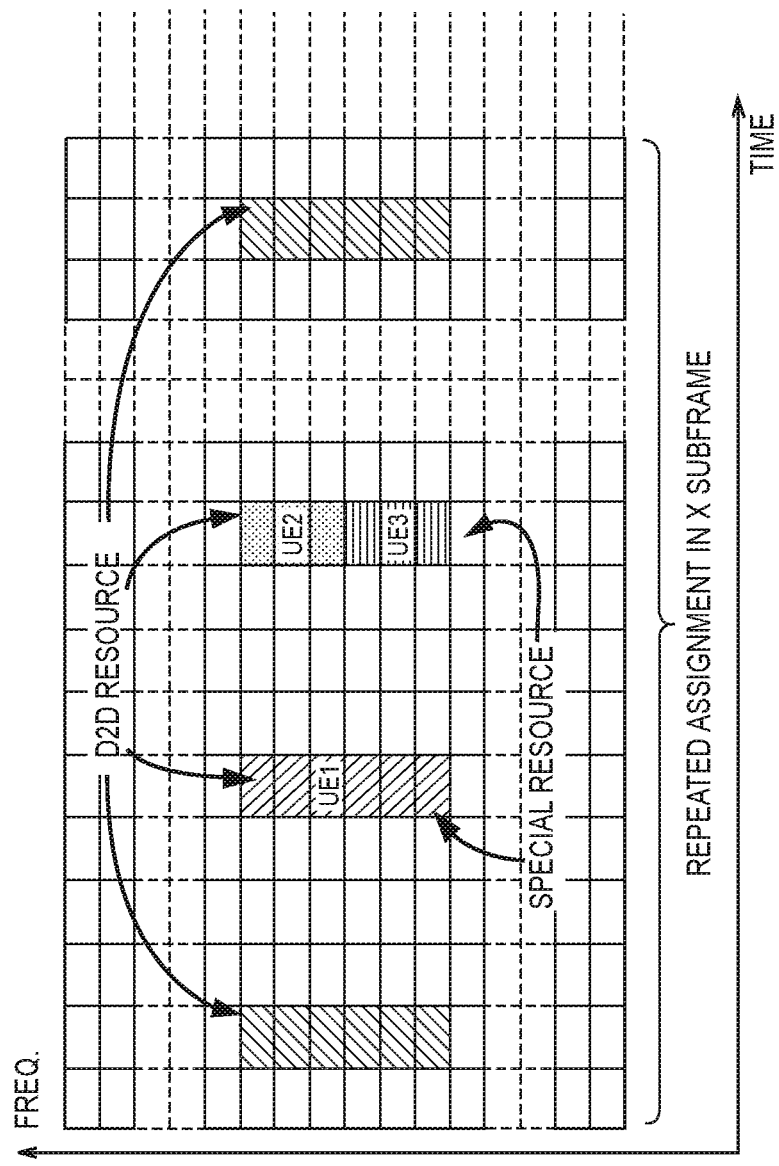
FIG. 14 is a diagram for explaining a second modification of the first embodiment.

When the control UE is present in each of the plurality of D2D groups, as shown in FIG. 14, the special radio resources may be different according to the D2D group. In the example in FIG. 14, a case is assumed where each of a UE 1 to a UE 3 is a control UE in a coverage. Each of the UE1 to UE3, when a D2D group is formed, receives assignment of special radio resources for its own D2D group from the eNB 200 and uses the special radio resources to transfer warning information or transmit information required to be transmitted with high reliability and at a low delay. Alternatively, the special radio resources may be determined by negotiation between the control UEs. In this case, the control UE that detects the presence of a neighbouring control UE notifies a neighbouring control UE of special radio resources in use or special radio resources desired to be used through broadcast or unicast. In the unicast, the neighbouring control UE makes a response (OK/NG or the like) to the notification. It is noted that the assignment of the special radio resources by the eNB 200 and the negotiation between control UEs may be used together.

[Other Modifications]

In the embodiment described above, the case is assumed where the frequency band of the D2D communication is shared with the uplink frequency band of the cellular communication; however, the frequency band of the D2D communication may be shared with the downlink frequency band of the cellular communication.

The first modification of the embodiment described above explains an example in which some D2D resources are secured as special radio resources to transmit, in the D2D communication, information required to be transmitted with high reliability and at a low delay in the D2D communication. However, the special radio resources may be used not only for D2D transmission but also for notification for the D2D transmission. For example, the special radio resources may be used as radio resources to notify of transmission of information required to be transmitted with high reliability and at a low delay.

In the above embodiment, as one example of a mobile communication system, the LTE system is explained. However, the present invention is not limited to the LTE system, and the present invention may be applied to systems other than the LTE system.

The first embodiment may be combined with a second embodiment described later.

Second Embodiment

Below, a second embodiment will be described while focusing on differences from the first embodiment.

The following assumptions are assumed in D2D Communication.

Public Safety Communication should be possible irrespective of availability of infrastructure coverage. Whether this needs to be achieved by D2D direct communication in all cases (e.g. in-coverage) remains to be studied.

We assume that D2D direct communication cannot be restricted to a dedicated carrier, i.e., D2D direct communication may appear on the same carrier as regular LTE. FFS how the NW can control (in particular for UEs in coverage) which resources they use for D2D communication.

1:M D2D communication is one-way and there is no feedback on L2 (MAC/RLC/PDCP).

According to these assumptions, all four scenarios (i.e., Out of Coverage, Partial Coverage, In Coverage-Single-Cell and In Coverage-Multi-Cell) will be described. In addition, it's required that regular LTE communication and D2D direct communication co-exist.

Below, we investigate three options for resource allocation for the in-coverage, the partial-coverage and Out-of-coverage D2D deployment scenarios based on above agreements. We will assume that UEs transmitting and receiving discovery signals are synchronized. UEs participating in D2D communication are already synchronized and have already discovered each other. LTE communication and D2D direct communication should be able to co-exist on the same carrier; therefore, radio resource for D2D communication and cellular communication should be configurable based on traffic demand in both partial coverage and in-coverage scenarios.

Potential issues for D2D resource allocation schemes in all scenarios are analysed.

For the out-of-coverage scenario, no UE can receive NW signalling directly. Since this scenario has never considered in the pre-Rel-12 NW, some entirely-new mechanisms should be introduced.

For the in-coverage scenario, all UEs interested in D2D communication can directly receive NW signalling.

On the other hand, at least one UE can't receive direct signalling from the NW in the partial coverage scenario. It should be considered how UE located in the out-of-coverage region manages to acquire radio resource information for D2D communication. Without this information out-of-coverage UE's (UE 100-2 in FIG. 7) may broadcast D2D communication during the time when in-coverage D2D Rx UE (UE 100-1 in FIG. 7) attempts to transmit cellular Tx to the eNB. Under this condition, UE 100-1 may not receive the broadcast D2D communication from UE 100-2. If D2D communication is performed on the DL, the issue may be even more severe since the D2D transmissions from UE 100-2 will interfere with the cellular's DL signals.

Figure 15:
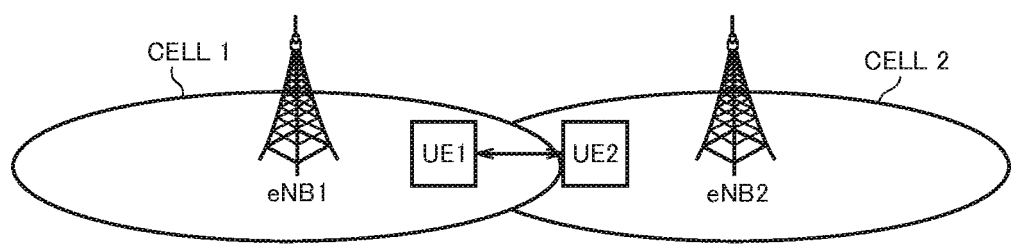
FIG. 15 is a diagram illustrating in-coverage-multi-cell scenario.

FIG. 15 is a diagram illustrating in-coverage-multi-cell scenario. As illustrated in FIG. 15, for achieving direct D2D communication between UEs located in different cells, same radio resources for D2D communication must be allocated to each D2D UE by each of the cells. So if the in-coverage-multi-cell scenario is supported in Rel-12, D2D communication capable cells should be coordinated.

(Analysis of Resource Allocation Schemes)

In the second embodiment, there seems to be three prominent types of resource allocation schemes i.e., centralized resource allocation, semi-distributed resource allocation and distributed resource allocation.

Centralized resource allocation means all D2D UEs are individually scheduled by the eNB. Therefore, all UEs interested in D2D communication must operate under the RRC connected mode.

Semi-distributed resource allocation means eNB allocates D2D resources to each group. For the semi-distributed resource allocation scheme, the eNB sends the resource allocation information to each of the cluster-head UEs. Within a D2D group, the D2D UEs may be scheduled by the associated cluster-head UE. In this scheme, at least the cluster-head UE must operate under the RRC connected mode.

For the distributed resource allocation scheme, all D2D UEs are allocated the same D2D resources by the eNB (or the NW). D2D UEs can autonomously use these resources for D2D communications (e.g., using CSMA). If this resource allocation scheme is selected, RAN2 should decide whether UEs interested in D2D communication are allowed to send D2D TX in RRC idle mode.

The entity responsible for the D2D link scheduling within a group for all scheduling schemes are summarized in Table 1.

Below, both the semi-distributed and distributed resource allocation schemes are analysed for all scenarios, whereas centralized resource allocation scheme is analysed only the in-coverage and partial coverage scenarios since none of the UEs can directly receive NW signalling.

TABLE 1

|  | Centralized | Semi-distributed | Distributed |
| --- | --- | --- | --- |
| In-coverage | eNB | Option1: eNB<br>Option 2: Cluster-head UE | Autonomous |
| Partial-coverage | eNB | Cluster-head UE | Autonomous |
| Out-of-coverage | N/A | Cluster-head UE | Autonomous |

If the centralized resource allocation scheme is selected, all UEs interested in D2D transmissions must operate in the RRC connected mode. If the semi-distributed resource allocation scheme is selected, at least the cluster-head UEs must operate in the RRC connected mode.

(1) Centralized Resource Allocation (1.1) In-Coverage Scenario

Figure 16:
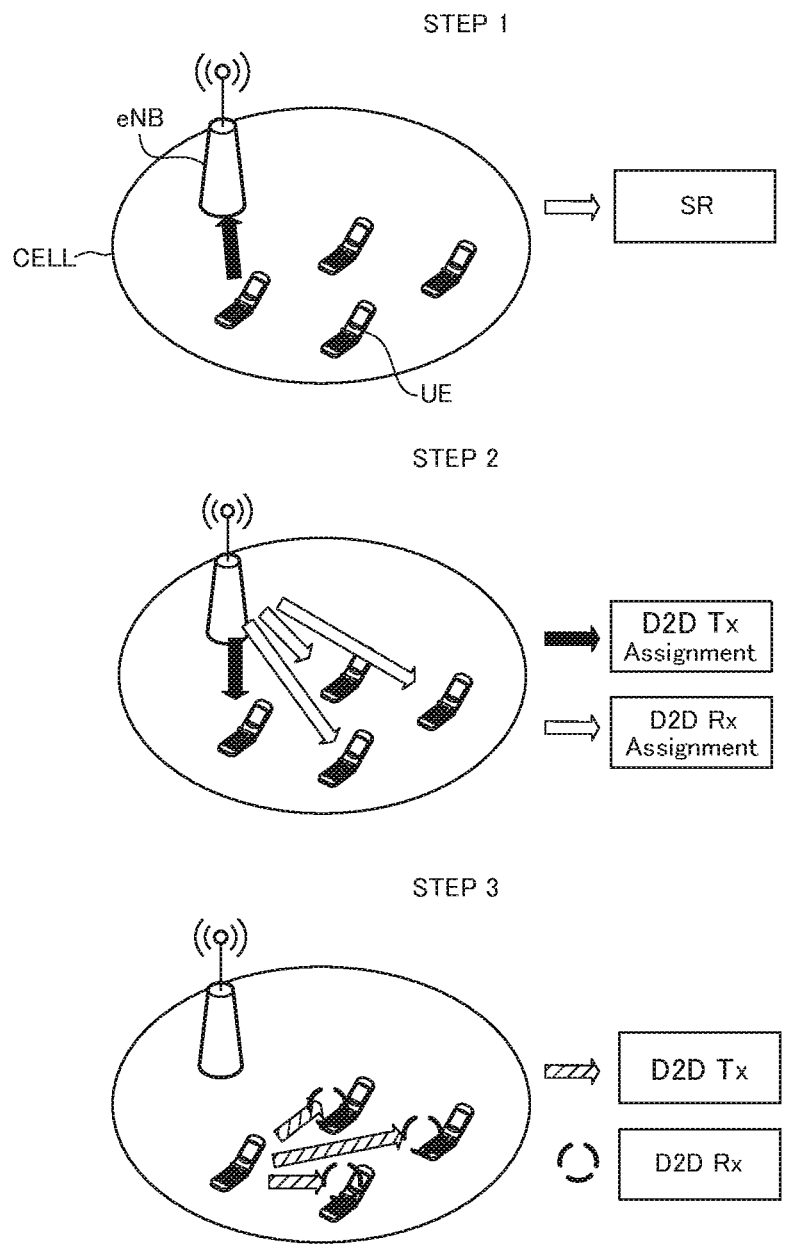
FIG. 16 is a diagram illustrating centralized resource allocation procedure (in-coverage scenario) according to a second embodiment.

FIG. 16 is a diagram illustrating centralized resource allocation procedure (in-coverage scenario). As illustrated in FIG. 16, for the in-coverage scenario, the following three steps are required for achieving centralized resource allocation.

STEP 1: Each D2D UE sends an SR and a buffer status to the eNB. This will allow the eNB to determine the amount of D2D resources needed for each D2D UE.

STEP 2: eNB assigns D2D communication resource(s) for each D2D UE. Both single resource allocation and multiple resource allocations (e.g., using SPS) are allowed.

STEP 3: D2D Communication.

The centralized resource allocation scheme is quite similar to the resource allocation scheme for cellular communication; therefore D2D Tx/Rx collision can be readily avoided. If D2D communication is no longer possible for some D2D UEs within a group (e.g., due to loss of D2D coverage based on discovery requirement), it's also possible for the eNB to transfer some D2D UEs back to cellular communication. However, scheduling coordination will be needed between neighbouring cells to support in-coverage-multi-cell scenario and it is FFS what level of signalling coordination will be needed if UEs located in-coverage-multi-cell start D2D communication. Due to the potential complexities, it would be worthwhile to compare the Pros and Cons associated with this resources allocation scheme as listed below.

Pros:

Higher spectral efficiency may be realized by reusing D2D resources for cellular UEs.

Resources are allocated based on actual need (taking into account of the QoS).

D2D Tx/Rx collision can be avoided.

The existing protocol mechanisms can be reused as much as possible.

Cons:

Signaling overhead may be increased depending on the number of D2D UEs requesting transmission resources.

Additional complexity to support in-coverage-multi-cell scenario.

(1.2) Partial Coverage Scenario

Figure 17:
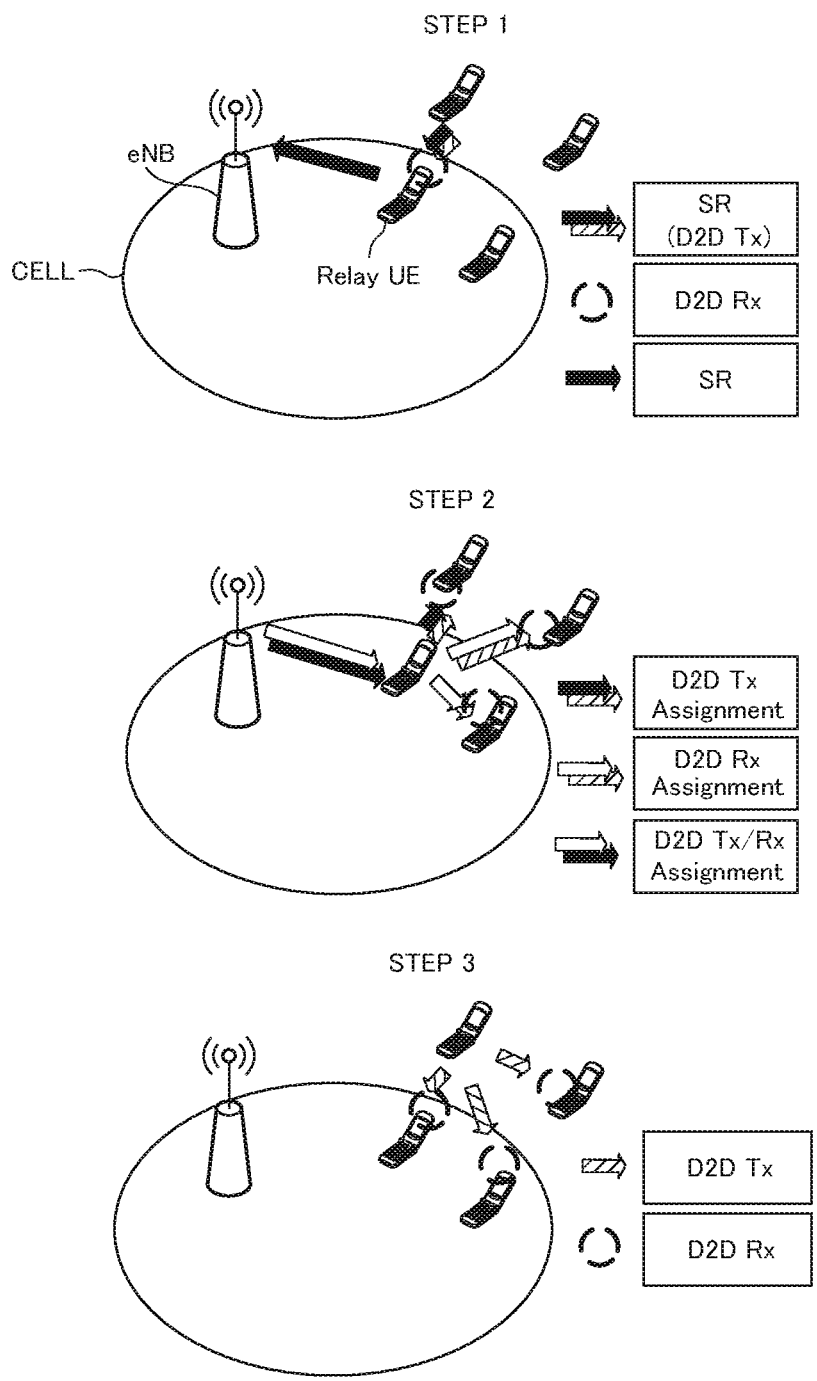
FIG. 17 is a diagram illustrating centralized resource allocation procedure (partial coverage scenario) according to the second embodiment.

FIG. 17 is a diagram illustrating centralized resource allocation procedure (partial coverage scenario). As illustrated in FIG. 17, for the partial coverage scenario, the following three steps are assumed for the case traffic is generated from the out of coverage UE.

STEP 1: Out of coverage UE sends an SR and a buffer status to the Relay UE via D2D communication enabled resource. Relay UE forwards the SR and the buffer status to the eNB.

STEP 2: eNB assigns D2D communication resource and sends this information to the Relay UE. Relay UE forwards this information to all group members. Other in-coverage UEs can also receive this information from the Relay UE.

STEP 3: D2D communication.

To handle the partial coverage scenario, the eNB selects a UE within each D2D group with cellular coverage to relay the eNB's messages to the remaining out-of-coverage D2D UEs. Since eNB have the responsibility for scheduling all D2D links, it may be assumed the eNB knows whether the signal from a D2D UE's Tx can reach all other D2D UEs within the group. And as described in STEP1, this resource allocation scheme will require the out-of-coverage UE to send an SR and buffer status to eNB via the relay UE. The complexity needed to coordinate this request for the eNB's and relay UE's is substantial and we think this option is almost impossible to accomplish.

Pros:

Higher spectral efficiency may be realized by reusing D2D resources for cellular UEs.

Resources are allocated based on actual need (taking into account of the QoS).

D2D Tx/Rx collision can be avoided.

Cons:

Signaling overhead may be increased depending on the number of D2D UEs requesting transmission resources.

Much higher complexity for the Relay UE.

Additional complexity to introduce control signaling between the Relay UE and the non-Relay UEs within the group.

Additional complexity to define how eNB determine whether the signal from a UE's D2D Tx can reach all other D2D UEs within the group.

(2) Semi-Distributed Resource Allocation (2.1) in-Coverage Scenario

In this resource allocation scheme a cluster-head controls the D2D resource allocation for D2D UEs. For the in-coverage scenario, there are two options for the cluster-head:

Option 1: The cluster-head is the eNB.

Option 2: Each D2D group has its own cluster-head UE.

Figure 18:
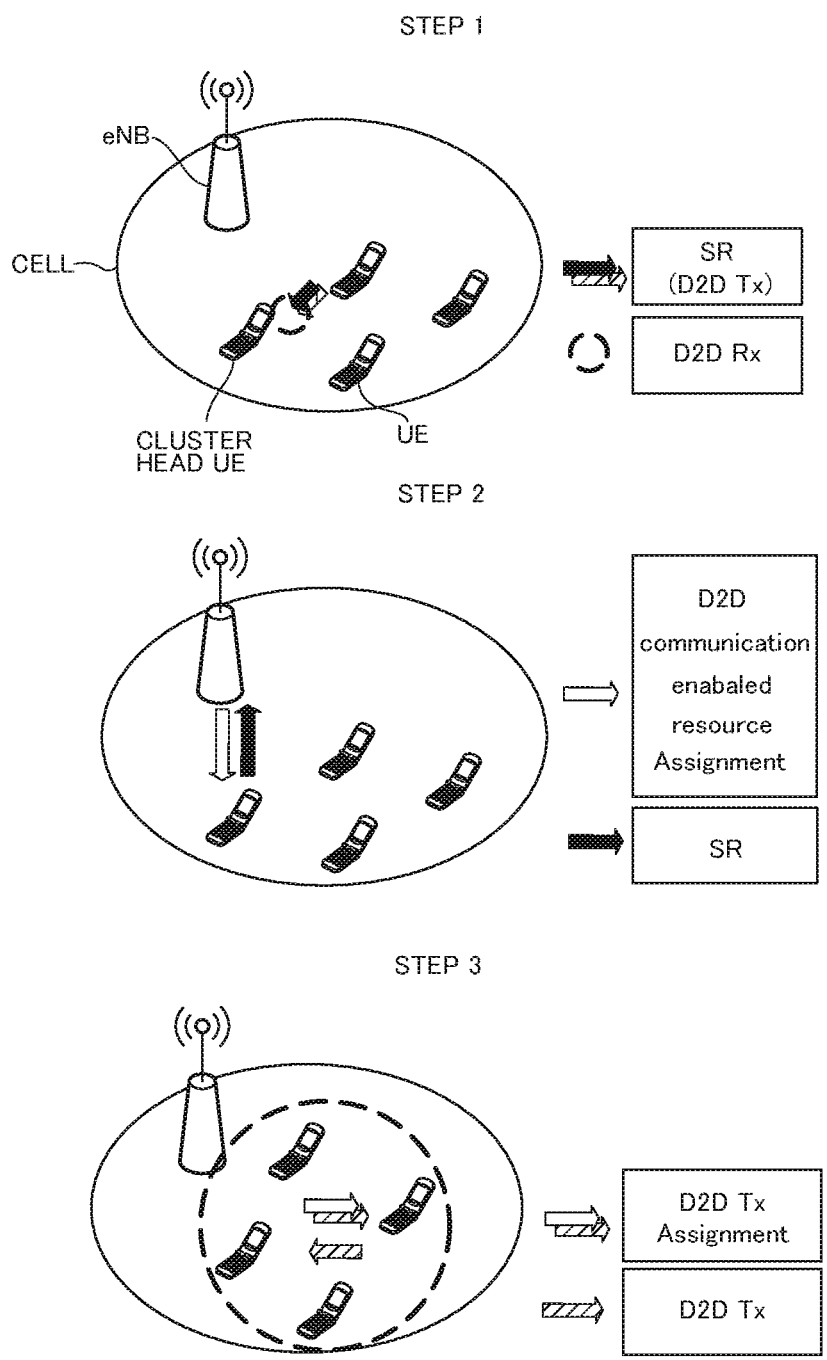
FIG. 18 is a diagram illustrating semi-distributed resource allocation procedure (in-coverage scenario) according to the second embodiment.

Since the resource allocation scheme with Option 1 is the same as the centralized resource allocation scheme for the in-coverage scenario, the following procedures and analysis will be based on Option 2. With Option 2, the cluster-head UE is only allowed to control D2D resources assigned by the eNB. The cluster-head UE is not allowed to use any other D2D resources not assigned to the cluster-head UE. It is assumed the resource allocation procedure is based on the following three steps:

FIG. 18 is a diagram illustrating semi-distributed resource allocation procedure (in-coverage scenario).

STEP 1: UE sends an SR and a buffer status to the cluster-head UE. It is assumed there is a special subframe e.g., a discovery subframe, that can be used by the out-of-coverage UE to request resources for access from the cluster-head UE.

STEP 2: The cluster-head UE requests D2D communication resource from the eNB, based on the combined resources required by all D2D UEs within its group. This allows the eNB to determine the amount of D2D resources needed for the D2D group. Only multiple resources can be allocated (e.g., using SPS). Other in-coverage UEs can receive this information. The cluster-head UE can simply report the number of D2D UEs within the group without the buffer status information.

STEP 3: The cluster-head UE schedules D2D transmissions or just forwards the allocated resources from the eNB to other D2D UEs within its group. Non-cluster-head UEs can transmit (broadcast) on the assigned or the informed resources to the remaining D2D UEs in the group.

D2D resources may be scheduled by the cluster-head UE for use by specific D2D UE (i.e., non-contention-based scheduling not needing) or the D2D resource may be scheduled by the cluster-head UE for use by all D2D UEs within the group (i.e., contention-based scheduling using). As mentioned in STEP 1, a special subframe or discovery subframe needs to be defined in order for the non-cluster-head UE to send an SR and a buffer status to the cluster-head UE prior to the assignment of dedicated D2D resources.

This scheme has the following Pros and Cons.

Pros:

Resources are allocated based on actual need (taking into account of the QoS).

Higher spectral efficiency can be realized by reusing D2D resources for cellular UEs when non-contention-based scheduling is used.

Cons:

Signaling overhead is increased due to the necessary coordination between the eNB and the cluster-head UE for resource allocation.

Higher complexity and load for the cluster head UE. Higher complexity due to cluster head UE acting as the scheduler for D2D transmissions within the group.

Additional complexity to introduce control signaling between the cluster-head UE and the non-cluster-head UEs.

Additional complexity to support in-coverage-multi-cell scenario.

(2.2) Partial Coverage Scenario

In the partial coverage scenario, the eNB can't serve as the cluster head for all D2D UEs, since out-of-coverage D2D UEs have no direct connection to the eNB. To handle partial coverage, a UE with the cellular link is assigned as the cluster-head and it relays eNB messages to the remaining D2D UEs within the same cluster. Since, the cluster-head UE schedules the D2D transmissions using the resources allocated by the eNB, collisions between cellular UL and D2D transmissions can be avoided.

FIG. 19 is a diagram illustrating semi-distributed resource allocation procedure (partial coverage scenario). As illustrated in FIG. 19, the procedure for this scheme is assumed to have the following three STEPs for traffic generated by the out-of-coverage UE.

STEP 1: The out-of-coverage UE sends an SR and a buffer status to the cluster-head UE. It is assumed there is a special subframe e.g., discovery subframe, that can be used by the out-of-coverage UE to request resources for access from the cluster-head D2D UE.

STEP 2: The cluster-head UE requests D2D communication resource from the eNB, based on the combined resources required by all D2D UEs within its group. This allows the eNB to determine the amount of D2D resources needed for each D2D group. Only multiple resources can be allocated (e.g., using SPS). Other in-coverage UEs can receive this information. The cluster-head UE can simply report the number of D2D UEs within the group without the buffer status information.

STEP 3: The cluster-head UE schedules D2D transmissions or just forwards allocated resources by eNB to other D2D UEs within its group. Non-cluster-head D2D UEs can transmit (broadcast) on the assigned or the informed resources to the remaining D2D UEs in the group. The cluster-head UE may forward transmissions from a D2D UE to other D2D UEs in case the D2D UE isn't able to reach one or more D2D UEs within the same group.

D2D resources may be scheduled by the cluster-head UE for use by one D2D UE (i.e., non-contention-based scheduling not needing) or the D2D resource may be scheduled by the cluster-head UE for all D2D UEs to use within the group (i.e., contention-based scheduling using). As mentioned in STEP 1, a special subframe or discovery subframe needs to be defined in order for the non-cluster-head D2D UE to send an SR and a buffer status to the cluster-head prior to the assignment of dedicated D2D resources.

This scheme has the following Pros and Cons.

Pros:

Resource is allocated based on actual need (taking into account of the QoS).

The cluster-head UE can relay eNB messages to D2D UEs within its group, esp. for the out-of-coverage D2D UEs.

Cons:

Signaling overhead is increased due to the necessary coordination between the eNB and the cluster-head UE for resource allocation.

Higher complexity and load for the cluster head UE. Higher complexity due to cluster head UE acting as the scheduler for D2D transmissions within the group.

Additional complexity to introduce control signaling between the cluster-head UE and the non-cluster-head UEs.

(2.3) Out-of-Coverage Scenario

The out-of-coverage scenario has not been considered in the Pre-Rel-12 NW. Therefore some new features which do not exist in the current specification should be introduced for treating this scenario well. One possibility is for the cluster-head UEs to negotiate with one another or for the cluster-head UE to find unoccupied resources (e.g., using CSMA), and decide which resources will be used for its group.

FIG. 20 is a diagram illustrating semi-distributed resource allocation procedure (out of coverage scenario). As illustrated in FIG. 20, it is assumed the resource allocation procedure is based on the following two steps.

STEP 1: The UE sends an SR and a buffer status to the cluster-head UE. It is assumed there is a special subframe e.g., discovery subframe, that can be used by the out-of-coverage UE to request resources for access from the cluster-head D2D UE.

STEP 2: The cluster-head UE schedules D2D transmissions or informs available resources for D2D communication to other D2D UEs within its group. Non-cluster-head D2D UEs can transmit (broadcast) on the assigned or the informed resources to the remaining D2D UEs in the group. The cluster-head UE may forward transmissions from a D2D UE to other D2D UEs in case the D2D UE isn't able to reach one or more D2D UEs within the same group.

Currently it is still FFS whether the overall allocation of time/frequency resources is predefined. Additionally, it is also FFS in RAN1 as to how resources are multiplexed among the different D2D groups (i.e., whether the resources are FDM or FDM plus TDM).

This scheme has the following Pros and Cons;

Pros:
Resource is allocated based on actual need (taking into account of the QoS).
D2D resources may be scheduled by the cluster-head UE for use by one D2D UE or the D2D resource may be scheduled by the cluster-head UE for all D2D UEs to use within the group.

Cons:
Signaling overhead is increased due to the necessary coordination between the eNB and the cluster-head UE for resource allocation.
Higher complexity and load for the cluster head UE. Higher complexity due to cluster head UE acting as the scheduler for D2D transmissions within the group.
Additional complexity to introduce control signaling between the cluster-head UE and the non-cluster-head UEs.

(3) Distributed Resource Allocation (3.1) In-Coverage Scenario

With the distributed resource allocation scheme, each UE independently decides whether to transmit or not (e.g., using CSMA). In other words, for each D2D subframe, each D2D UE decides whether to transmit in that D2D subframe, since there is no cluster-head UE that coordinates the D2D resources.

FIG. 21 is a diagram illustrating distributed resource allocation procedure (in-coverage scenario). As illustrated in FIG. 21, it is assumed the resource allocation procedure is based on the following three steps.

STEP 1: eNB determines how much D2D resources must be allocated. For example, this could be based on the number of UEs interested in D2D communication.

STEP 2: eNB assigns D2D communication resource(s) via broadcast.

STEP 3: D2D communication on available resource(s) selected by UE within the informed one(s) in STEP2.

The procedure assumes the eNB should determine the amount of D2D resources that needs to be allocated. This may require a new mechanism e.g., by counting the number of UEs interested in D2D communication. Depending on the accuracy of such a mechanism there may be situations when the allocated resources are insufficient or excessive. However, this has the benefit of reduced complexity in supporting the in-coverage-multi-cell scenario.

Also, this technique has already worked well on the unlicensed-band. This scheme has the following Pros and Cons.

Pros:
UE can perform D2D Tx without dedicated control signaling from NW.
None of the complexities associated with the support of cluster head UEs.
Less complexity to support in-coverage-multi-cell scenario.

Cons:
Lower spectral efficiency (Less QoS support, cannot reuse D2D resources for the cellular UL transmissions, resources needed are unknown in advance).
The usage of D2D resources requires schemes such as CSMA since the resources are not assigned.
There is the possibility that the assigned resources may not be used.
To introduce D2D Tx/Rx collision avoidance mechanism within a D2D group.

(3.2) Partial Coverage Scenario

For the partial coverage scenario, the same mechanism may be reused as the in-coverage scenario. However, there is the additional complexity for an in-coverage UE to relay the D2D communication resource assignment information to out-of-coverage D2D UEs.

FIG. 22 is a diagram illustrating distributed resource allocation procedure (partial coverage scenario). As illustrated in FIG. 22, the following three steps are required for the distributed resource allocation.

STEP 1: eNB determines how much D2D resources must be allocated. For example, this could be based on the number of UEs interested in D2D communication.

STEP 2: eNB assigns D2D communication resource(s) via broadcast. A Relay UE forwards this information to out-of-coverage D2D UEs, if the Relay UE notices the presence of out-of-coverage D2D UEs. It is FFS how the Relay UE is selected if more than one in-coverage D2D UEs in the group can be selected as the Relay UE.

STEP 3: D2D communication on available resource(s) selected by UE within the informed one(s) in STEP2.

The Pros and Cons are similar to the in-coverage scenario. In addition, RAN2 should consider the collision avoidance mechanism between in-coverage UE's cellular Tx and the out-of-coverage D2D UE's Rx. Therefore further study is needed how to relay eNB messages to D2D UEs within its group, esp. for the out-of-coverage D2D UEs.

This scheme has the following Pros and Cons.

Pros:
UE can perform D2D Tx without dedicated control signaling from NW.
None of the complexities associated with the support of cluster-head UEs.

Cons:
Lower spectral efficiency (Less QoS support, Cannot reuse D2D resources for the cellular UL transmissions, resources needed are unknown in advance).
The usage of D2D resources requires the use of a scheme such as CSMA since the resources are not assigned.
There is possibility that the assigned resources may not be used.
Additional complexity to relay eNB messages to D2D UEs within its group, esp. for the out-of-coverage D2D UEs.
To introduce D2D Tx/Rx collision avoidance mechanism within a D2D group.

(3.3) OUT OF COVERAGE SCENARIO

As we mentioned, it has yet to decide to the overall design of the time/frequency resources in the out-of-coverage scenario. Assuming the following two steps are required for the distributed resource allocation for the out-of-coverage scenario.

STEP 1: Each UE independently decides whether to transmit (e.g., using CSMA) on the pre-defined resources.
STEP 2: D2D communication.

This scheme has the following Pros and Cons;
Pros:
UE can perform D2D Tx without dedicated control signaling from cluster head UEs.
None of the complexities associated with the support of cluster head UEs.
Less complexity to support in-coverage-multi-cell scenario.
Cons:
Lower spectral efficiency (Less QoS support, Cannot reuse D2D resources for the cellular UL transmissions, resources needed are unknown in advance).
To introduce D2D Tx/Rx collision avoidance mechanism within a D2D group.

(Summary of Resource Allocation Schemes)

After analysing the Pros and Cons for each resource allocation scheme for both deployment scenarios we arrived at the following observations.

For all resource allocation schemes, the same resource allocation scheme may be applied to both the in-coverage scenario and the partial coverage scenario. For the partial coverage scenario, it is assumed that one of the D2D UEs will relay the resource allocation information to the out-of-coverage D2D UEs, regardless of the resource allocation scheme.

The centralized resource allocation and the semi-distributed resource allocation schemes provide control over resources per group, whereas the distributed resource allocation scheme does not provide per group control.

Although the centralized resource allocation and the semi-distributed resource allocation schemes have the benefit of higher spectral-efficiency relative to the distributed resource allocation scheme, it comes at the cost of higher signalling overhead relative to distributed resource allocation scheme.

CROSS REFERENCE

The entire contents of U.S. Provisional Application No. 61/883,655 (filed on Sep. 27, 2013) and U.S. Provisional Application No. 61/898,826 (filed on Nov. 1, 2013) are incorporated herein by reference.

INDUSTRIAL APPLICABILITY

The present invention is useful for mobile communication fields.

The invention claimed is:

1. A user terminal supporting D2D (Device-to-Device) communication, comprising:
   a receiver configured to receive system information blocks (SIBs) from a base station, the SIBs including resource information for determining time and frequency resources used for the D2D communication;
   the receiver further configured to receive configuration information from the base station, the configuration information identifying certain periodic subframes, wherein the certain periodic subframes are to be used for broadcasting, by the user terminal, control information to other user terminals, and are not to be used for transmitting, by the user terminal, D2D data, wherein the control information includes the resource information included in the SIB s;
   a controller configured to use the certain periodic subframes indicated by the configuration information to periodically broadcast the control information including the resource information included in the SIBs to other user terminals being out of coverage of the base station; and
   a transmitter configured to transmit D2D data while avoiding transmitting the D2D data in the certain periodic subframes indicated by the configuration information.

2. A device to be equipped in a user terminal supporting D2D (Device-to-Device) communication, comprising:
   a processor and a memory coupled to the processor, the memory including a program, wherein the processor is configured to execute the program stored in the memory to execute processes of:
      receiving system information blocks (SIBs) from a base station, the SIBs including resource information for determining time and frequency resources used for the D2D communication;
      receiving configuration information from the base station, the configuration information identifying certain periodic subframes, wherein the certain periodic subframes are to be used for broadcasting, by the user terminal, control information to other user terminals, and are not to be used for transmitting, by the user terminal, D2D data, wherein the control information includes the resource information included in the SIB s;
      using the certain periodic subframes indicated by the configuration information to periodically broadcast the control information including the resource information included in the SIBs to other user terminals being out of coverage of the base station; and
      transmitting D2D data while avoiding transmitting the D2D data in the certain periodic subframes indicated by the configuration information.

* * * * *